United States Patent
Heitzenrater et al.

(10) Patent No.: US 9,234,551 B2
(45) Date of Patent: Jan. 12, 2016

(54) TRANSMISSION AND A CLUTCH ASSEMBLY FOR A VEHICLE

(75) Inventors: Scott William Heitzenrater, Orion, MI (US); Robert Neil Paciotti, White Lake, MI (US); Douglas John Dwenger, Plymouth, MI (US); Larry D. Diemer, Clarkston, MI (US); John A. Diemer, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 441 days.

(21) Appl. No.: 13/611,447

(22) Filed: Sep. 12, 2012

(65) Prior Publication Data

US 2014/0069763 A1 Mar. 13, 2014

(51) Int. Cl.
*F16D 25/12* (2006.01)
*F16D 25/08* (2006.01)
*F16D 23/14* (2006.01)

(52) U.S. Cl.
CPC .............. *F16D 25/083* (2013.01); *F16D 23/14* (2013.01); *F16D 25/082* (2013.01); *F16D 25/12* (2013.01)

(58) Field of Classification Search
CPC ....................... F16D 2048/0212; F16D 25/048
USPC ....................................................... 192/85.49
See application file for complete search history.

(56) References Cited

U.S. PATENT DOCUMENTS

| | | | |
|---|---|---|---|
| 6,786,843 B2* | 9/2004 | Mizuno | 475/120 |
| 6,851,526 B2* | 2/2005 | Ore | 188/170 |
| 7,111,833 B2* | 9/2006 | Wittkopp | F16D 25/12 192/70.17 |
| 8,272,490 B2* | 9/2012 | Obergasser | 192/85.39 |
| 2009/0188768 A1* | 7/2009 | Harashima et al. | F16D 25/0638 192/85.41 |
| 2011/0100157 A1* | 5/2011 | Roses et al. | 74/606 R |

FOREIGN PATENT DOCUMENTS

| | | |
|---|---|---|
| DE | 102004034392 A1 | 2/2006 |
| EP | 1617096 A2 | 1/2006 |

OTHER PUBLICATIONS

Article entitled "Asymmetrical Belleville Springs", Research Disclosure Journal, Sep. 1, 2010, www.researchdisclosure.com, 2 pages, Research Disclosure Database No. 557032.

* cited by examiner

*Primary Examiner* — Robert Hodge
*Assistant Examiner* — Ryan Dodd
(74) *Attorney, Agent, or Firm* — Quinn Law Group, PLLC

(57) ABSTRACT

A transmission and a clutch assembly for a vehicle are disclosed. The clutch assembly includes a housing defining a cavity presenting an interior surface. The interior surface defines a pocket along a longitudinal axis. The clutch assembly further includes a piston disposed in the pocket and movable between an initial position and a final position relative to the pocket along the longitudinal axis. The piston includes a plurality of flanges extending outwardly away from the longitudinal axis. The clutch assembly also includes a biasing member attached to the interior surface of the housing and engaging the piston to continuously bias the piston toward the initial position. The biasing member abuts the flanges of the piston to prevent rotation of the piston about the longitudinal axis as the piston moves between the initial and final positions along the longitudinal axis.

20 Claims, 4 Drawing Sheets

TRANSMISSION AND A CLUTCH ASSEMBLY FOR A VEHICLE

TECHNICAL FIELD

The present disclosure relates to a transmission and a clutch assembly for a vehicle.

BACKGROUND

Clutches are commonly used in vehicles. Some clutches include a component movable along a central axis. In some instances, the component rotates about the central axis concurrently with the movement along the central axis. A seal can cooperate with the component and the sealing ability of the seal can change as the component rotates about the central axis during movement along the central axis.

SUMMARY

The present disclosure provides a clutch assembly for a vehicle. The clutch assembly includes a housing defining a cavity presenting an interior surface. The interior surface defines a pocket along a longitudinal axis. The clutch assembly further includes a piston disposed in the pocket and movable between an initial position and a final position relative to the pocket along the longitudinal axis. The piston includes a plurality of flanges extending outwardly away from the longitudinal axis. The clutch assembly also includes a biasing member attached to the interior surface of the housing and engaging the piston to continuously bias the piston toward the initial position. The biasing member abuts the flanges of the piston to prevent rotation of the piston about the longitudinal axis as the piston moves between the initial and final positions along the longitudinal axis.

The present disclosure also provides a transmission for a vehicle including an engine. The transmission includes a housing configured for attachment to the engine. The housing defines a cavity presenting an interior surface, with the interior surface defining a pocket along a longitudinal axis. The transmission further includes an input member coupled to the housing and partially disposed in the cavity. The input member is rotatable about the longitudinal axis and configured for receiving a torque to start the engine. The transmission also includes a damper apparatus disposed in the cavity. The damper apparatus includes a cage coupled to the input member and an isolator plate disposed in the cage. The isolator plate is attached to the input member such that the isolator plate concurrently rotates with the input member about the longitudinal axis. In addition, the transmission includes a piston including a plurality of flanges, with the piston disposed in the pocket and movable between an initial position and a final position relative to the pocket along the longitudinal axis. The cage is disconnected from the isolator plate when the piston is in the initial position to allow relative movement between the isolator plate and the cage about the longitudinal axis. The cage is connected to the isolator plate when the piston is in the final position to provide synchronized movement of the isolator plate and the cage about the longitudinal axis. The transmission further includes a biasing member attached to the interior surface of the housing and engaging the piston to continuously bias the piston toward the initial position. The biasing member abuts the flanges of the piston to prevent rotation of the piston about the longitudinal axis as the piston moves between the initial and final positions along the longitudinal axis.

The present disclosure further provides a transmission for a vehicle. The transmission includes a housing defining a cavity presenting an interior surface. The interior surface defines a pocket along a longitudinal axis. The transmission further includes a piston disposed in the pocket and movable between an initial position and a final position relative to the pocket along the longitudinal axis. The piston includes a first side and a second side spaced from each other along the longitudinal axis. The second side is disposed in the pocket of the housing. The piston includes a plurality of flanges disposed between the first and second sides. The flanges extend outwardly away from the longitudinal axis, and each of the flanges define a first depression and a second depression spaced from each other to present a shoulder between respective first and second depressions of respective flanges. The transmission also includes a biasing member attached to the interior surface of the housing and engaging the piston to continuously bias the piston toward the initial position. In addition, the transmission includes a bearing device abutting the first side of the piston and disposed outside of the pocket. The biasing member couples the bearing device to the first side of the piston such that the bearing device concurrently moves with the piston between the initial and final positions. The biasing member includes a plurality of tabs spaced from each other radially relative to the longitudinal axis. One of the tabs engage the shoulder of one of the flanges and another one of the tabs engage the shoulder of another one of the flanges to prevent rotation of the piston about the longitudinal axis as the piston moves between the initial and final positions along the longitudinal axis.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
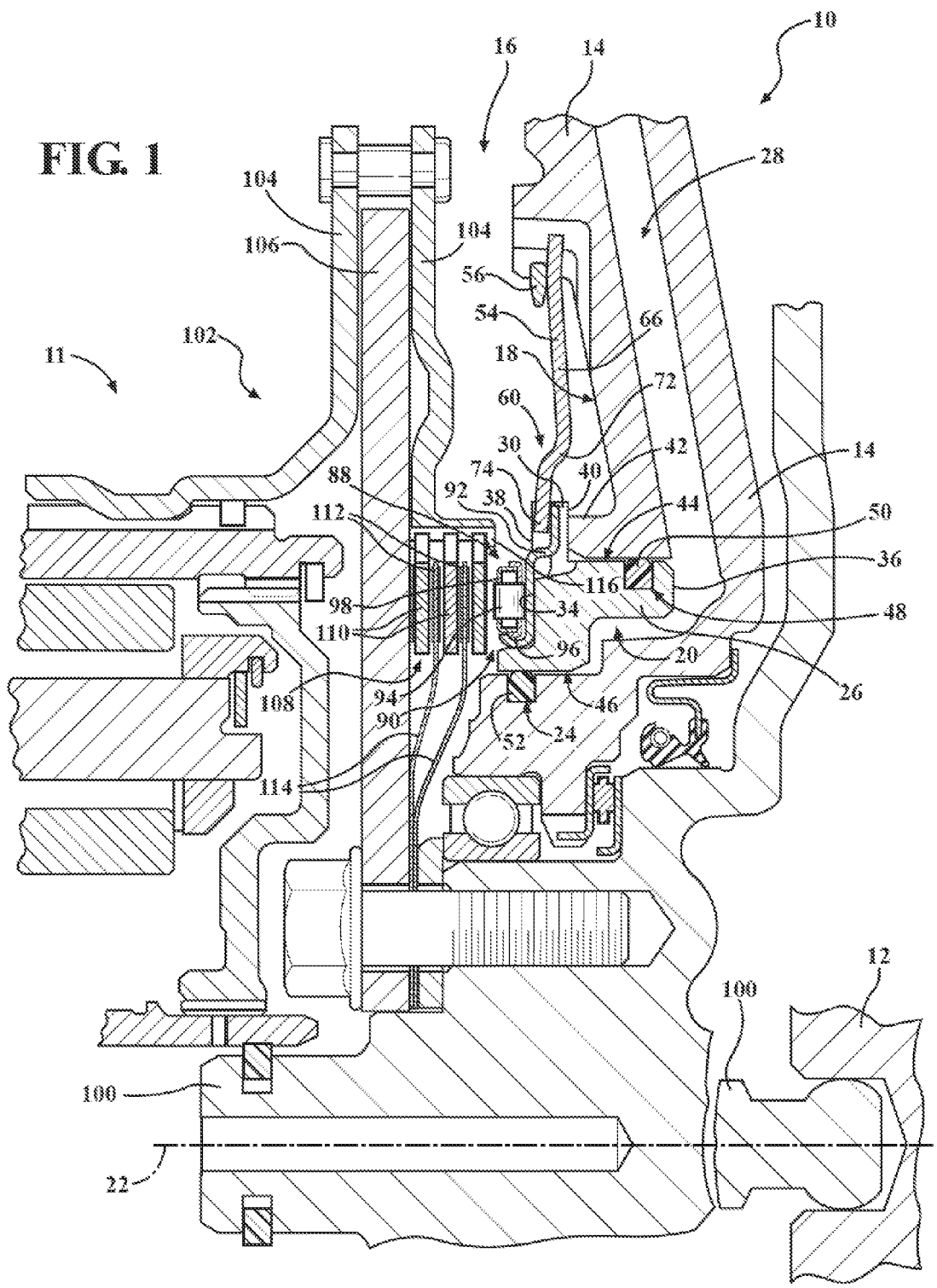
FIG. 1 is a schematic cross-sectional view of a transmission and a clutch assembly with a piston in an initial position.
Figure 2:
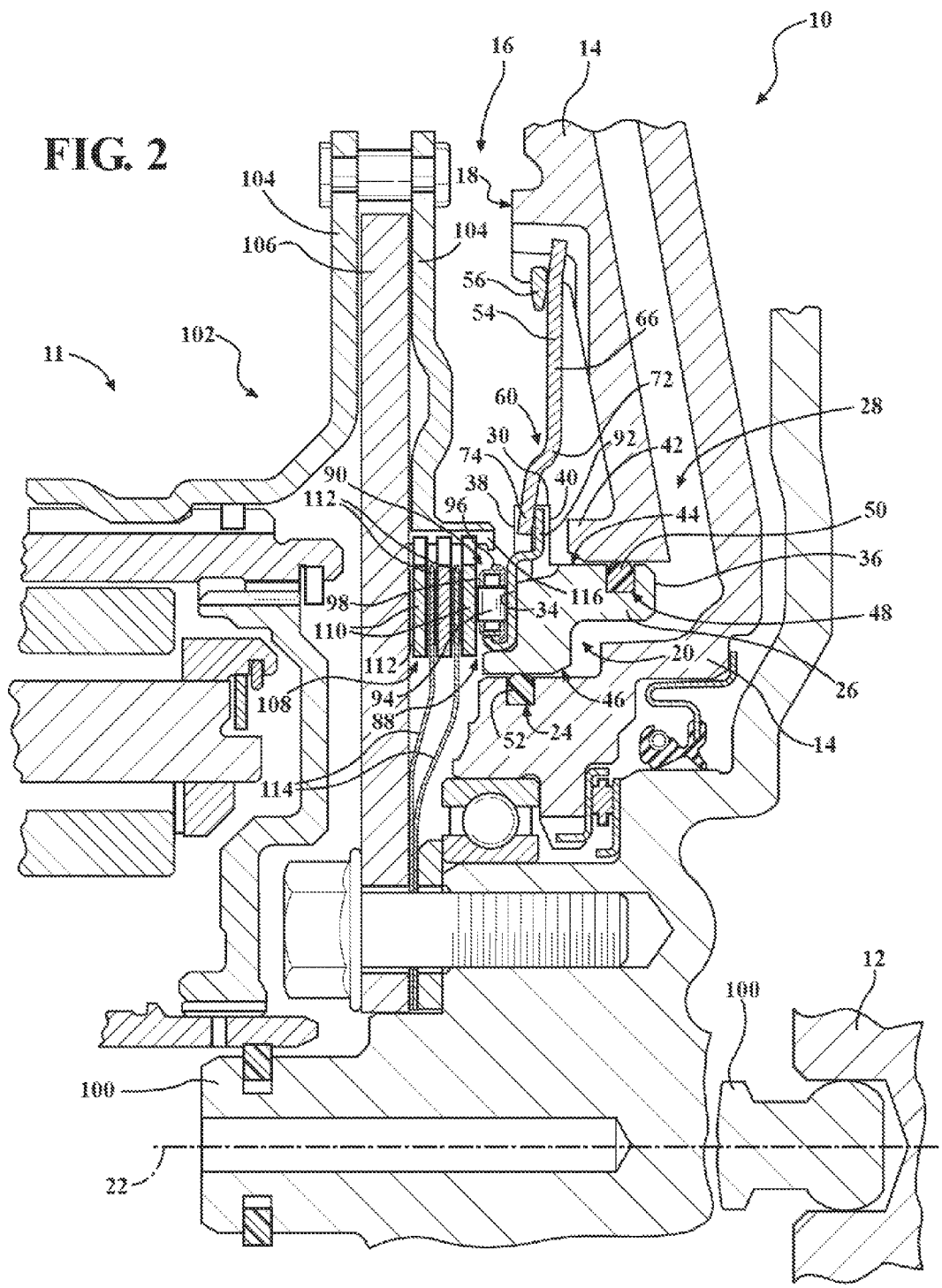
FIG. 2 is a schematic cross-sectional view of the transmission and the clutch assembly with the piston in a final position.

Referring to the Figures, wherein like numerals indicate like or corresponding parts throughout the several views, a clutch assembly 10 for a vehicle and a transmission 11 of the vehicle is generally shown in FIGS. 1 and 2.

In certain embodiments, the clutch assembly 10 is for the transmission 11 of the vehicle including an engine 12, with the engine 12 shown schematically in FIGS. 1 and 2. Hence, in various embodiments, the transmission 11 includes the clutch assembly 10. For example, the clutch assembly 10 can be utilized in a hybrid vehicle transmission 11. The hybrid vehicle transmission 11 can include a first motor/generator and/or a second motor/generator as known to those skilled in the art. In various embodiments, the first and/or second motors can be electric motors. It is to be appreciated that the transmission 11 can include other components not specifically discussed herein. It is to also be appreciated that the clutch assembly 10 can be utilized in a transmission other than a hybrid vehicle transmission 11. Furthermore, it is to be appreciated that the clutch assembly 10 can be commonly referred to as a by-pass clutch. It is to further be appreciated that the clutch assembly 10 discussed below can be utilized as a clutch other than a by-pass clutch, such as, for example, a plate clutch. Generally, the clutch assembly 10 can be utilized with any stationary piston utilizing a bearing apply.

Figure 4:
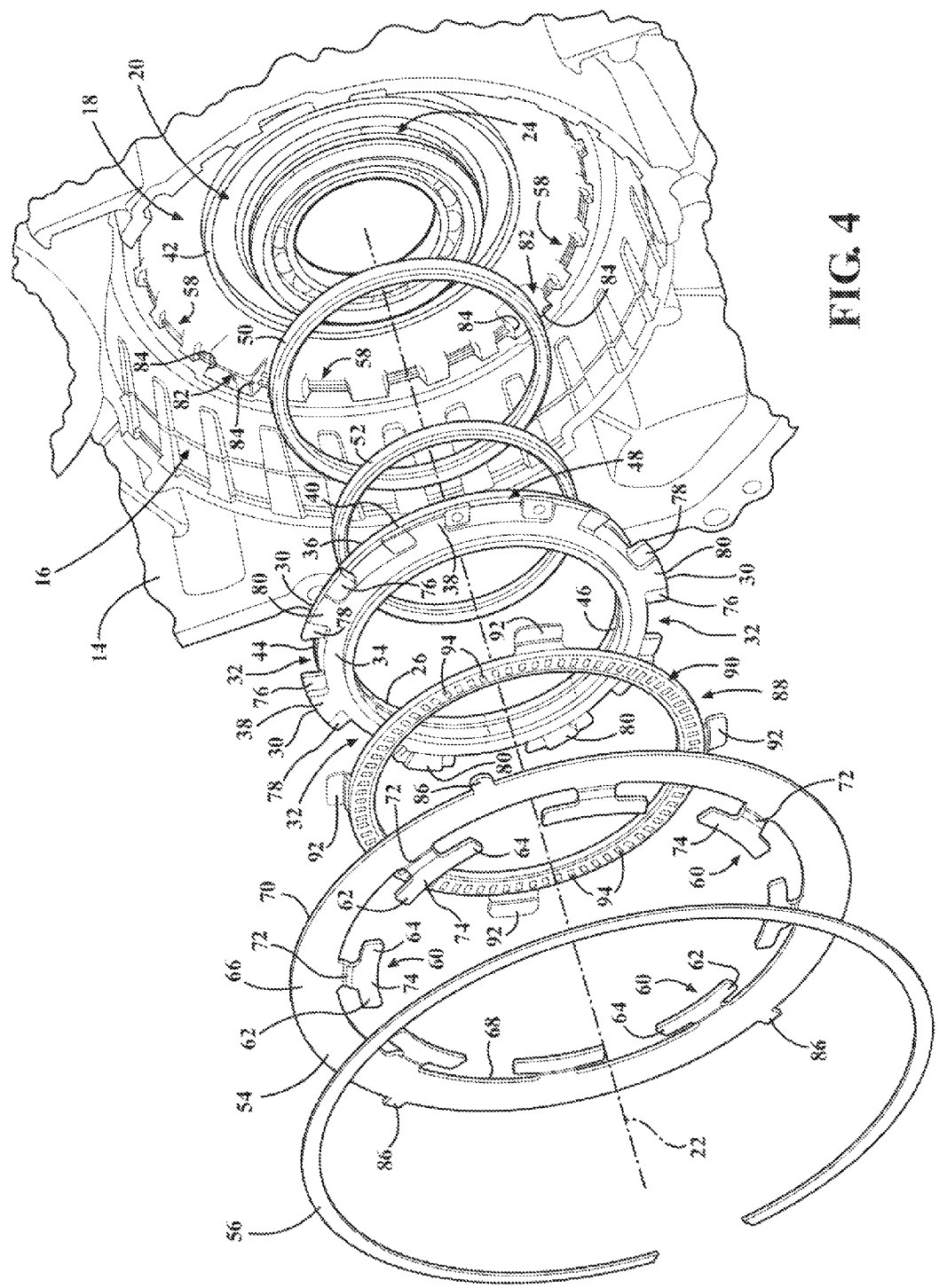
FIG. 4 is a schematic exploded view of the piston, the bearing device, the biasing member, the retainer, a first seal, and a second seal.

Turning to FIGS. 1, 2, and 4, the clutch assembly 10 includes a housing 14 defining a cavity 16 presenting an interior surface 18. Generally, the housing 14 is configured for attachment to the engine 12. As such, the housing 14 is disposed adjacent to the engine 12. In certain embodiments, the housing 14 can be further defined as a transmission housing. It is to be appreciated that the housing 14 can be any suitable configuration.

The interior surface 18 of the housing 14 defines a pocket 20 along a longitudinal axis 22. The interior surface 18 of the housing 14 also defines a slot 24 adjacent to the pocket 20. More specifically, the slot 24 is disposed radially relative to the longitudinal axis 22. Therefore, in certain embodiments, the slot 24 is disposed between the longitudinal axis 22 and the pocket 20. It is to be appreciated that the pocket 20 and the slot 24 can be disposed in any suitable location.

The clutch assembly 10 further includes a piston 26 disposed in the pocket 20 and movable between an initial position and a final position relative to the pocket 20 along the longitudinal axis 22. As such, the piston 26 is disposed in the cavity 16 of the housing 14. When the piston 26 is in the initial position, the piston 26 can move along the longitudinal axis 22 to the final position. Furthermore, when the piston 26 is in the final position, the piston 26 can move along the longitudinal axis 22 back to the initial position. Therefore, the piston 26 is movable between the initial and final positions. The initial position is shown in FIG. 1 and the final position is shown in FIG. 2. It is to be appreciated that only a portion of the clutch assembly 10 above the longitudinal axis 22 is shown schematically in FIGS. 1 and 2, and those skilled in the art will recognize that these components are generally symmetrical about the longitudinal axis 22.

Generally, a fluid is disposed in the pocket 20 behind the piston 26. Specifically, the housing 14 defines a channel 28 in fluid communication with the pocket 20 for guiding the fluid into and out of the pocket 20 as desired. The amount of fluid in the pocket 20 changes the position of the piston 26 in the pocket 20 along the longitudinal axis 22. For example, a hydraulic system can be utilized to change the amount of fluid in the pocket 20. It is to be appreciated that any suitable motor, system, device, apparatus, etc., can be utilized to change the amount of fluid in the pocket 20. Additional discussion of how the fluid and the piston 26 cooperate with each other will be provided further below.

Turning to FIG. 4, the piston 26 includes a plurality of flanges 30, and in certain embodiments, the flanges 30 extend outwardly away from the longitudinal axis 22. The flanges 30 are spaced from each other radially relative to the longitudinal axis 22 to define a plurality of gaps 32. The gaps 32 and the flanges 30 are arranged in an alternating pattern about the longitudinal axis 22. Said differently, the gaps 32 and the flanges 30 alternate with each other about the longitudinal axis 22. For example, one of the gaps 32 is disposed between an adjacent pair of flanges 30 and another one of the gaps 32 is disposed between another adjacent pair of flanges 30, etc. It is to be appreciated that any suitable number of flanges 30 and gaps 32 can be utilized.

Also referring back to FIGS. 1 and 2, the piston 26 further includes a first side 34 and a second side 36 spaced from each other along the longitudinal axis 22. Generally, the first and second sides 34, 36 of the piston 26 extend transverse to the longitudinal axis 22 and the flanges 30 are generally disposed between the first and second sides 34, 36. Therefore, the gaps 32 are generally disposed between the first and second sides 34, 36. In certain embodiments, the flanges 30 are disposed adjacent to the first side 34 of the piston 26. The first side 34 faces away from the pocket 20 and the second side 36 is disposed in the pocket 20 of the housing 14. In certain embodiments, the first side 34 of the piston 26 is spaced from the pocket 20. In addition, in certain embodiments, the second side 36 of the piston 26 is spaced from the interior surface 18 of the housing 14 when the piston 26 is in the initial and final positions.

The flanges 30 of the piston 26 include a front side 38 adjacent to the first side 34 of the piston 26 and a back side 40 spaced from the first side 34 of the piston 26. In certain embodiments, the front side 38 is substantially parallel to the first side 34 of the piston 26 and the back side 40 of the piston 26 is substantially parallel to the second side 36 of the piston 26. Generally, the front and back sides 38, 40 extend transverse to the longitudinal axis 22. Furthermore, the front and back sides 38, 40 of the flanges 30 are spaced from each other along the longitudinal axis 22. It is to be appreciated that the front and back sides 38, 40 can be any suitable configuration.

When the piston 26 is in the initial position, the back side 40 of the flanges 30 can engage or abut the interior surface 18 of the housing 14. Therefore, in certain embodiments, the housing 14 can include an abutment 42 cooperating with the back side 40 of the flanges 30. As such, when the back side 40 of the flanges 30 engage the abutment 42, the piston 26 is in the initial position and further movement of the piston 26 in that direction is prevented. Hence, when the piston 26 is in the final position, the back side 40 of the flanges 30 are spaced from the abutment 42. It is to be appreciated that the abutment 42 can be any suitable configuration and location.

Referring to FIGS. 1, 2, and 4, the piston 26 further includes an outer surface 44 facing away from the longitudinal axis 22 with the flanges 30 extending from the outer surface 44. Furthermore, the piston 26 includes an inner surface 46 opposing the outer surface 44. As such, the inner surface 46 faces the longitudinal axis 22. Generally, the outer surface 44 is disposed between the first and second sides 34, 36 of the piston 26, and similarly, the inner surface 46 is disposed between the first and second sides 34, 36. In certain embodiments, the outer surface 44 spaces the back side 40 of the flanges 30 away from the second side 36 of the piston 26.

The outer surface 44 defines a groove 48, and more specifically, the groove 48 is disposed radially relative to the longitudinal axis 22. It is to be appreciated that the groove 48 can be at any suitable location and configuration. Furthermore, it is to be appreciated that the outer and inner surfaces 44, 46 can be any suitable configuration.

The clutch assembly 10 can further include a first seal 50 disposed in the groove 48 and engaging the pocket 20 of the housing 14 for sealing the pocket 20 between the interior surface 18 of the housing 14 and the outer surface 44 of the piston 26. Therefore, the first seal 50 is mounted to the piston 26 and moves concurrently with the piston 26 between the initial and final positions.

Additionally, the clutch assembly 10 can include a second seal 52 disposed in the slot 24 and engaging the inner surface 46 of the piston 26 for sealing the pocket 20 between the interior surface 18 of the housing 14 and the inner surface 46 of the piston 26. Therefore, the second seal 52 is mounted to the interior surface 18 of the housing 14 and remains stationary as the piston 26 moves between the initial and final positions. When the piston 26 moves between the initial and final positions, the first and second seals 50, 52 prevent fluid from leaking into the cavity 16 of the housing 14. In other words, as the piston 26 moves between the initial and final positions, the first and second seals 50, 52 prevent fluid from leaking out of the pocket 20 between the piston 26 and the interior surface 18 of the housing 14. Preventing rotation of the piston 26 about the longitudinal axis 22 can prevent issues with the first and second seals 50, 52. For example, preventing rotation of the piston 26 about the longitudinal axis 22 can assist in maintaining the integrity of the first and second seals 50, 52 which can extend the life/function of the seals 50, 52.

The clutch assembly 10 also includes a biasing member 54 attached to the interior surface 18 of the housing 14. Hence, the biasing member 54 is disposed in the cavity 16 of the housing 14. The biasing member 54 engages the piston 26 to continuously bias the piston 26 toward the initial position. In other words, the biasing member 54 applies a first force to the piston 26 along the longitudinal axis 22. Generally, the biasing member 54 applies the first force to the first side 34 of the piston 26, and more specifically, applies the first force to the front side 38 of the flanges 30. It is to be appreciated that the first force can be applied to the piston 26 at any suitable location. In certain embodiments, the biasing member 54 is further defined as a spring. It is to be appreciated that the spring can be a Belleville spring or any other suitable biasing member.

To move the piston 26 from the initial position to the final position, fluid flows into the pocket 20 which applies a second force to the second side 36 of the piston 26. Fluid continues to flow into the pocket 20 until the second force overcomes the first force applied by the biasing member 54 such that the piston 26 moves along the longitudinal axis 22 and partially out of the pocket 20 to the final position. To move the piston 26 back to the initial position from the final position, fluid flows out of the pocket 20 until the first force applied by the biasing member 54 overcomes the second force such that the piston 26 moves back to the initial position. It is to be appreciated that the second force can be applied to a portion of the outer and/or inner surfaces 44, 46 as well. Furthermore, it is to be appreciated that the second force can be applied to the piston 26 at any suitable location.

The clutch assembly 10 can further include a retainer 56 coupled to the interior surface 18 of the housing 14 and engaging the biasing member 54 for attaching or securing the biasing member 54 to the interior surface 18 of the housing 14. Generally, the biasing member 54 is disposed between the interior surface 18 of the housing 14 and the retainer 56 along the longitudinal axis. Specifically, the interior surface 18 of the housing 14 can define a recess 58 (see FIG. 4) disposed radially about the longitudinal axis 22 with the retainer 56 disposed in the recess 58 for securing the retainer 56 to the interior surface 18. The recess 58 is spaced radially away from the pocket 20 relative to the longitudinal axis 22. In other words, the pocket 20 is disposed between the recess 58 and the longitudinal axis 22. In certain embodiments, the retainer 56 is further defined as a snap ring. It is to be appreciated that the biasing member 54 can be coupled/secured/ attached to the interior surface 18 by any suitable methods. It is to further be appreciated that the recess 58 can be any suitable location and configuration.

Figure 3:
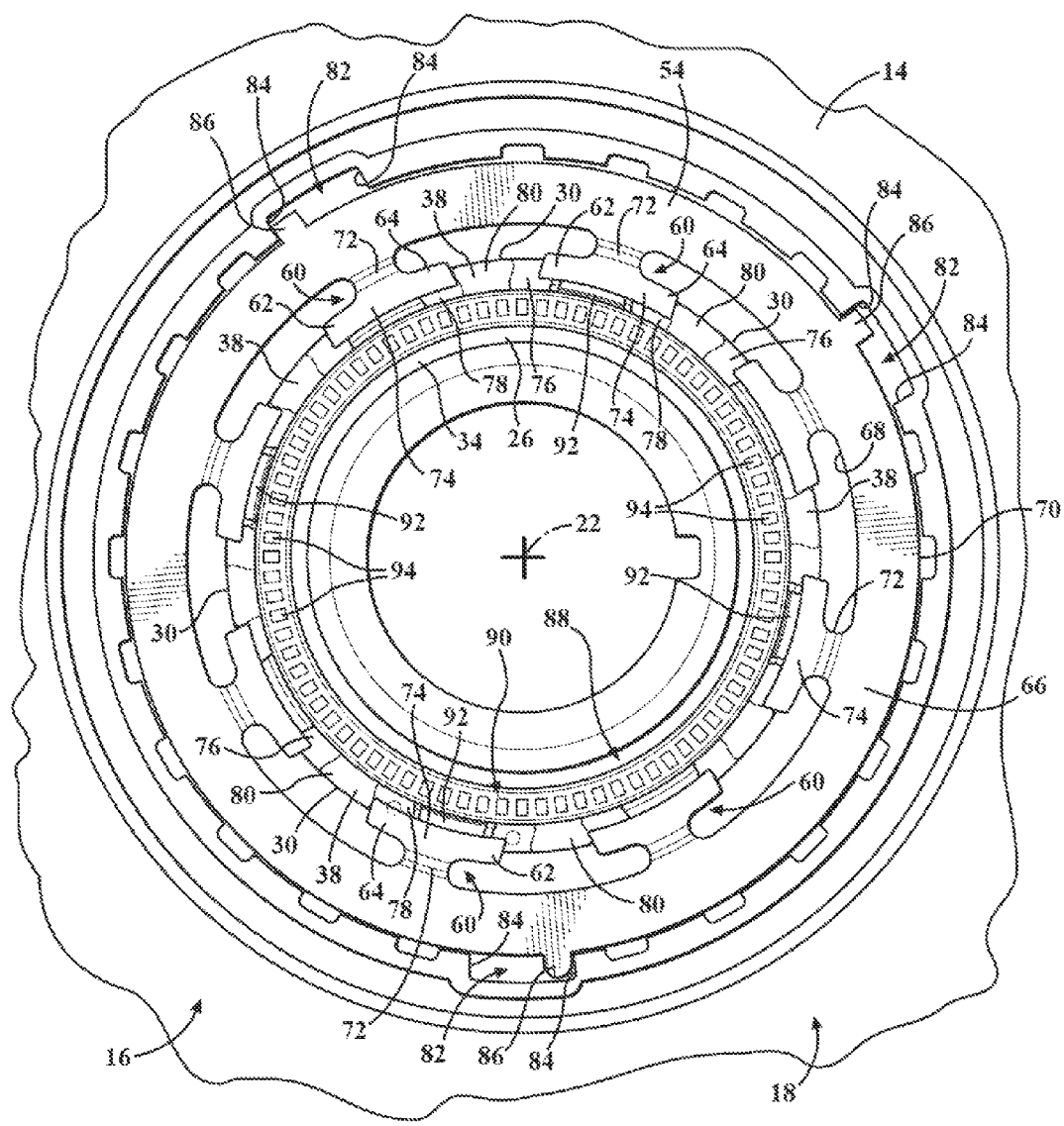
FIG. 3 is a schematic end view of the piston, a bearing device, and a biasing member coupled to a housing with a retainer removed to illustrate projections of the biasing member disposed in cutouts of the housing.

Turning to FIGS. 3 and 4, the biasing member 54 abuts the flanges 30 of the piston 26 to prevent rotation of the piston 26 about the longitudinal axis 22 as the piston 26 moves between the initial and final positions along the longitudinal axis 22. In certain embodiments, the biasing member 54 includes a plurality of tabs 60 spaced from each other radially relative to the longitudinal axis 22 with the tabs 60 engaging respective flanges 30 to prevent rotation of the piston 26 about the longitudinal axis 22. In certain embodiments, the tabs 60 engage the front side 38 of the flanges 30. Generally, one of the tabs 60 overlap one of the gaps 32 and another one of the tabs 60 overlap another one of the gaps 32. This overlapping pattern is repeated for the remaining tabs 60 and gaps 32. It is to be appreciated that any suitable number of tabs 60 can be utilized.

Furthermore, each of the tabs 60 include a first end 62 and a second end 64 spaced from each other. The first end 62 of one of the tabs 60 engage one of the flanges 30 and the second end 64 of the same one of the tabs 60 engage another one of the flanges 30. This pattern is repeated for the first and second ends 62, 64 of the remaining tabs 60 and the flanges 30.

The biasing member 54 further includes a body 66 having a first edge 68 and a second edge 70 spaced from each other transverse to the longitudinal axis 22. Generally, the tabs 60 extend from the first edge 68 of the body 66. Furthermore, the retainer 56 engages the body 66 to attach or secure the biasing member 54 to the interior surface 18 of the housing 14. It is to be appreciated that the retainer 56 can engage the biasing member 54 at any suitable location.

In certain embodiments, each of the tabs 60 include a neck 72 extending from the first edge 68 of the body 66 toward the longitudinal axis 22. Each of the tabs 60 also include a strip 74 extending from the neck 72 of respective tabs 60 such that the neck 72 is disposed between the first edge 68 and the strip 74. The strip 74 of each of the tabs 60 include the first and second ends 62, 64 spaced from each other radially relative to the longitudinal axis 22. Generally, the strip 74 of each of the tabs 60 engage respective flanges 30 and the strip 74 of each of the tabs 60 overlap respective gaps 32. Therefore, the first end 62 of one strip 74 engages one of the flanges 30 and the second end 64 of the same strip 74 engages another one of the flanges 30, etc. It is to be appreciated that the biasing member 54 can be any suitable configuration for continuously biasing the piston 26 toward the initial position and for preventing rotation of the piston 26 about the longitudinal axis 22.

Each of the flanges 30 define a first depression 76 and a second depression 78 spaced from each other to present a shoulder 80 between respective first and second depressions 76, 78 of respective flanges 30. More specifically, the front side 38 of each of the flanges 30 define the first and second depressions 76, 78. The shoulder 80 of each of the flanges 30 are spaced from each other radially relative to the longitudinal axis 22. Furthermore, the strip 74 of each of the tabs 60 extend from the neck 72 of respective tabs 60 such that the strip 74 of each of the tabs 60 engage the shoulder 80 of respective flanges 30. As discussed above, the tabs 60 are spaced from each other and the shoulder 80 of each of the flanges 30 are spaced from each other; thus, the shoulder 80 of each of the flanges 30 and the tabs 60 of the biasing member 54 are arranged in an alternating pattern about the longitudinal axis 22. It is to be appreciated that the flanges 30 can be any suitable location and configuration to cooperate with the biasing member 54.

The first and second depressions 76, 78 receive the biasing member 54 such that the biasing member 54 engages the shoulder 80 of the flanges 30 to prevent rotation of the piston 26 about the longitudinal axis 22. Generally, one of the tabs 60 engage the shoulder 80 of one of the flanges 30 and another one of the tabs 60 engage the shoulder 80 of another one of the flanges 30 to prevent rotation of the piston 26 about the longitudinal axis 22. More specifically, one of the tabs 60 engage the shoulder 80 of one of the flanges 30 and another one of the tabs 60 engage the shoulder 80 of another one of the flanges 30 to prevent rotation of the piston 26 about the longitudinal axis 22 as the piston 26 moves between the initial and final positions along the longitudinal axis 22. Furthermore, the first end 62 of one of the tabs 60 is disposed in the first depression 76 of one of the flanges 30 and the second end 64 of the same one of the tabs 60 is disposed in the second depression 78 of another one of the flanges 30. This first end 62/first depression 76 and second end 64/second depression 78 pattern is repeated for the remaining tabs 60 and the flanges 30. Therefore, the second end 64 of each of the tabs 60 engage or abut the shoulder 80 of respective flanges 30. More specifically, the second end 64 of one strip 74 of one tab 60 engages the shoulder 80 of one flange 30 and the second end 64 of another strip 74 of another tab 60 engages another shoulder 80 of another flange 30. It is to be appreciated that the first end 62 of each of the tabs 60 can engage or abut the shoulder 80 of respective flanges 30, in addition to or instead of, the second end 64 engaging or abutting the shoulder 80 of respective flanges 30.

In various embodiments, the interior surface 18 of the housing 14 can also define a cutout 82 spaced from the pocket 20 to present a plurality of ridges 84. Furthermore, the biasing member 54 can include a projection 86 extending from the second edge 70 and disposed in the cutout 82 of the interior surface 18. Generally, the projection 86 abuts one of the ridges 84 for preventing rotation of the biasing member 54 about the longitudinal axis 22. In certain embodiments, the cutout 82 is further defined as a plurality of cutouts 82 spaced from each other radially relative to the longitudinal axis 22 and the projection 86 is further defined as a plurality of projections 86 spaced from each other radially relative to the longitudinal axis 22. As such, one of the projections 86 can be disposed in one of the cutouts 82 and another one of the projections 86 can be disposed in another one of the cutouts 82, etc., such that the projections 86 abut respective ridges 84. It is to be appreciated that the projection(s) 86 can extend from the biasing member 54 at any suitable location. It is to further be appreciated that the projections 86 can be defined as the same configuration or as different configurations. For example, as shown in FIG. 3, two of the projections 86 define a generally square configuration and one of the projections 86 define a generally arcuate configuration. It is to be appreciated that any suitable number of cutouts 82 and projections 86 can be utilized. It is to further be appreciated that the projection(s) 86 can be any suitable configuration.

Referring to FIGS. 1 and 4, the clutch assembly 10 can further include a bearing device 88 abutting the first side 34 of the piston 26. Generally, the bearing device 88 is disposed outside of the pocket 20. The orientation and configuration of the piston 26, the biasing member 54, and the bearing device 88 provides for compact axial packaging of these components. Preventing rotation of the piston 26 about the longitudinal axis 22 as discussed above can also prevent issues with the bearing device 88 which can extend the life/function of the bearing device 88.

The biasing member 54 engages the bearing device 88 such that the biasing member 54 couples the bearing device 88 to the piston 26. In other words, the biasing member 54 retains the bearing device 88 such that the bearing device 88 remains in engagement with the piston 26. Therefore, the bearing device 88 is piloted to the piston 26 by the biasing member 54.

As such, the bearing device 88 is movable concurrently with the piston 26 between the initial and final positions. In other words, the biasing member 54 couples the bearing device 88 to the first side 34 of the piston 26 such that the bearing device 88 concurrently moves with the piston 26 between the initial and final positions. It is to be appreciated that the bearing device 88 can abut or engage the piston 26 at other suitable locations.

The bearing device 88 includes a sleeve 90 and a plurality of fingers 92 attached to the sleeve 90. Generally, the fingers 92 are spaced from each other radially relative to the longitudinal axis 22. One of the fingers 92 is disposed in one of the gaps 32 and another one of the fingers 92 is disposed in another one of the gaps 32 such that the fingers 92 engage respective tabs 60 of the biasing member 54 to couple the bearing device 88 to the first side 34 of the piston 26. More specifically, respective tabs 60 overlap respective fingers 92 to couple or retain the bearing device 88 to the piston 26. In certain embodiments, the fingers 92 engage the strip 74 of respective tabs 60 such that the strip 74 of the respective tabs 60 overlap the respective fingers 92 to couple or retain the bearing device 88 to the piston 26. It is to be appreciated that any suitable number of fingers 92 can be utilized.

The bearing device 88 further includes a plurality of rollers 94 spaced from each other radially about the longitudinal axis 22. Generally, the sleeve 90 supports the rollers 94 such that the rollers 94 can rotate independently of each other. The sleeve 90 can include a first member 96 and a second member 98 attached to each other with the rollers 94 contained in the first and second members 96, 98. A portion of each of the rollers 94 are disposed outside of the sleeve 90 such that the rollers 94 are exposed to the cavity 16 of the housing 14 and face away from the first side 34 of the piston 26. In certain embodiments, another portion of each of the rollers 94 are disposed outside of the sleeve 90 and faces the first side 34 such that the rollers 94 can engage a portion of the fingers 92. Therefore, the first and second members 96, 98 can each define a plurality of openings to dispose a portion of each of the rollers 94 outside of the sleeve 90. It is to be appreciated that the first and second members 96, 98 can be attached to each other by any suitable methods, such as press fit, welding, adhesive, fastener(s), etc. It is to further be appreciated that the sleeve 90 can be formed of any suitable structure for supporting the rollers 94.

In certain embodiments, the fingers 92 are attached to the first member 96 of the sleeve 90. In other embodiments, the fingers 92 are attached to the second member 98 of the sleeve 90. In yet other embodiments, the fingers 92 are attached to both of the first and second members 96, 98. The fingers 92 can be elongated such that a portion of the fingers 92 overlap the first and/or second members 96, 98 and another portion of the fingers 92 extend outwardly away from the first and second members 96, 98 which does not overlap. It is to be appreciated that the fingers 92 can be attached to the sleeve 90 at any suitable location. It is to further be appreciated that the fingers 92 can be attached to the sleeve 90 by any suitable methods, such as, for example, fastener(s), coupler(s), snap fit, tab(s), adhesive, welding, press fit, integrally forming together the sleeve 90 and the fingers 92, etc.

Turning to FIGS. 1 and 2, the clutch assembly 10 can also include an input member 100 coupled to the housing 14 and partially disposed in the cavity 16. As such, a portion of the input member 100 is disposed outside of the housing 14 to cooperate with the engine 12. The input member 100 is rotatable about the longitudinal axis 22 and configured for receiving a torque. More specifically, the input member 100 is rotatable about the longitudinal axis 22 and configured for receiving the torque to start the engine 12. In other words, rotation of the input member 100 can start the engine 12.

In addition, the clutch assembly 10 can include a damper apparatus 102 disposed in the cavity 16 and coupled to the input member 100. The damper apparatus 102 includes a cage 104 coupled to the input member 100 and an isolator plate 106 disposed in the cage 104. The isolator plate 106 is attached to the input member 100 such that the isolator plate 106 concurrently rotates with the input member 100 about the longitudinal axis 22. More specifically, the isolator plate 106 extends radially away from the input member 100 relative to the longitudinal axis 22 and the isolator plate 106 concurrently rotates with the input member 100 about the longitudinal axis 22. In other words, the isolator plate 106 and the input member 100 commonly rotate about the longitudinal axis 22.

The cage 104 is also rotatable about the longitudinal axis 22. The cage 104 is disconnected from the isolator plate 106 when the piston 26 is in the initial position to allow relative movement between the isolator plate 106 and the cage 104 about the longitudinal axis 22. The cage 104 is connected to the isolator plate 106 when the piston 26 is in the final position to provide synchronized movement of the isolator plate 106 and the cage 104 about the longitudinal axis 22. Therefore, when the cage 104 is connected to the isolator plate 106, both the cage 104 and the isolator plate 106 concurrently or commonly rotate with the input member 100 to start the engine 12. Accordingly, when the cage 104 is disconnected from the isolator plate 106, the input member 100 does not start the engine 12. It is to be appreciated that the damper apparatus 102 can include other components, such as, for example, a plurality of isolator springs coupled to the isolator plate 106 and the cage 104 to dampen relative movement between the isolator plate 106 and the cage 104 when the piston 26 is in the initial position.

The clutch assembly 10 can further include a coupling device 108 coupled to the input member 100 and the damper apparatus 102. Generally, the coupling device 108 aligns with the bearing device 88 and the piston 26 such that the coupling device 108 and the bearing device 88 cooperate with each other. In certain embodiments, the coupling device 108 is coupled to the cage 104, the isolator plate 106, and the input member 100. The bearing device 88 engages the coupling device 108 when the piston 26 is in the final position to connect the cage 104 to the isolator plate 106 to provide synchronized movement of the isolator plate 106 and the cage 104 with the input member 100 about the longitudinal axis 22. More specifically, the bearing device 88 engages the coupling device 108 when the piston 26 is in the final position to connect the cage 104 to the isolator plate 106 to provide synchronized movement of the isolator plate 106 and the cage 104 with the input member 100 about the longitudinal axis 22 for starting the engine 12.

The coupling device 108 includes a first friction plate 110 coupled to the cage 104 such that the first friction plate 110 concurrently rotates with the cage 104. The coupling device 108 also includes a second friction plate 112 coupled to the input member 100 such that the second friction plate 112 concurrently rotates with the input member 100 and the isolator plate 106. Furthermore, the first friction plate 110 can be movable relative to the cage 104 along the longitudinal axis 22 and the second friction plate 112 can be movable relative to the input member 100 along the longitudinal axis 22. For example, in certain embodiments, the first friction plate 110 is splined to the cage 104 such that the first friction plate 110 can move along the longitudinal axis 22. The second friction plate 112 is attached to an arm 114 which is coupled to the input member 100 such that the arm 114 flexes to allow the second friction plate 112 to move along the longitudinal axis 22. It is to be appreciated that the cage 104 can include a lip 116 for preventing the first friction plate 110 for detaching from the cage 104. As such, the first friction plate 110 is disposed between the isolator plate 106 and the lip 116. It is to be appreciated that the first friction plate 110 can be coupled or attached to the cage 104 by any suitable methods. Furthermore, it is to be appreciated that the second friction plate 112 can be coupled or attached to the input member 100 by any suitable methods.

In certain embodiments, the first friction plate 110 extends radially toward the input member 100 relative to the longitudinal axis 22 and the second friction plate 112 extends radially away from the input member 100 relative to the longitudinal axis 22 such that the first and second friction plates 110, 112 cooperate to selectively engage each other. Generally, the bearing device 88 engages one of the first and second friction plates 110, 112 when the piston 26 is in the final position to sandwich the first and second friction plates 110, 112 between the bearing device 88 and the isolator plate 106 to connect the cage 104 to the isolator plate 106. Therefore, when the piston 26 is in the initial position, the first and second friction plates 110, 112 are spaced from each other to allow relative movement between the isolator plate 106 and the cage 104, with the bearing device 88 spaced from the first and second friction plates 110, 112. In certain embodiments, the bearing device 88 engages the first friction plate 110 when the piston 26 is in the final position. Having the bearing device 88 secured to the piston 26 prevents inadvertent touching of the friction plates 110, 112 with the bearing device 88 when the piston 26 is in the initial position which can reduce noise, vibration, harshness (NVH), etc.

It is to be appreciated that the bearing device 88 can engage the second friction plate 112 instead of the first friction plate 110. It is to further be appreciated that the first friction plate 110 can be defined as a reaction plate and the second friction plate 112 can be defined as a frictional plate having frictional material. It is to also be appreciated that the first friction plate 110 can be defined as the frictional plate and the second friction plate 112 can be defined as the reaction plate. Furthermore, any suitable frictional material can be utilized to create friction between the first and second friction plates 110, 112 to connect the cage 104 to the isolator plate 106. In addition, it is to be appreciated that various components of FIGS. 1 and 2 have been exaggerated for illustrative purposes only.

In various embodiments, the first friction plate 110 is further defined as a plurality of first friction plates 110 spaced from each other and the second friction plate 112 is further defined as a plurality of second friction plates 112 spaced from each other. The first and second friction plates 110, 112 can be arranged in an alternating pattern with each other along the longitudinal axis 22. For example, one of the second friction plates 112 can be disposed between an adjacent pair of first friction plates 110, etc. The first friction plates 110 and the second friction plates 112 are sandwiched together between the bearing device 88 and the isolator plate 106 when the piston 26 is in the final position. It is to be appreciated that one of the second friction plates 112 can be mounted to the isolator plate 106.

For illustrative purposes only, the operation of the clutch assembly 10 to start the engine 12 will be discussed below. As a reminder, the biasing member 54 continuously biases the piston 26 toward the initial position by applying the first force to the first side 34 of the piston 26. Initially for this discussion, the piston 26 is in the initial position as shown in FIG. 1.

When it is desirable to start the engine 12 of the vehicle, a motor is actuated to rotate the input member 100 about the longitudinal axis 22. The hydraulic system is also actuated such that fluid flows into the pocket 20 and applies the second force to the second side 36 of the piston 26. When the second force is greater than the first force applied by the biasing member 54, the piston 26 moves from the initial position toward the final position. The piston 26 moves along the longitudinal axis 22 toward the first and second friction plates 110, 112 and the biasing member 54 flexes as the piston 26 moves toward the friction plates 110, 112. When the piston 26 is in the final position, as shown in FIG. 2, the rollers 94 of the bearing device 88 engage the first friction plate 110 to sandwich together the first and second friction plates 110, 112 between the bearing device 88 and the isolator plate 106. Sandwiching the first and second friction plates 110, 112 together allow the cage 104 to be connected to the isolator plate 106 to provide synchronized movement of the cage 104 and the isolator plate 106 with the input member 100. Therefore, the rollers 94 apply an axial force to the first and second friction plates 110, 112 along the longitudinal axis 22 to connect the cage 104 to the isolator plate 106. The rollers 94 rotate when applying the axial force due to the cage 104 and the isolator plate 106 rotating about the longitudinal axis 22. As such, the piston 26, the first seal 50, the biasing member 54, the sleeve 90 of the bearing device 88, and the fingers 92 of the bearing device 88 do not rotate about the longitudinal axis 22 when the rollers 94 of the bearing device 88 engage the first and second friction plates 110, 112. When the piston 26 is in the final position, the cage 104 is connected to the isolator plate 106 and the input member 100 to start the engine 12. Therefore, when the piston 26 is in the final position, the cage 104 and the isolator plate 106 will rotate about the longitudinal axis 22 simultaneously.

Once the engine 12 is started, it is desirable to move the piston 26 from the final position back to the initial position. The hydraulic system is deactivated such that fluid flows out of the pocket 20 until the first force applied to the first side 34 of the piston 26 by the biasing member 54 is greater than the second force such that the piston 26 moves from the final position toward the initial position. The piston 26 moves along the longitudinal axis 22 away from the first and second friction plates 110, 112 and the biasing member 54 flexes back to its original orientation as the piston 26 moves away from the friction plates 110, 112. The rollers 94 stop rotating when the rollers 94 disengage from the first friction plate 110. When the piston 26 is in the initial position, as shown in FIG. 1, the rollers 94 of the bearing device 88 are spaced from the first friction plate 110 and the back side 40 of the flanges 30 engage the abutment 42. Spacing the rollers 94 away from the first friction plate 110 disconnects the cage 104 from the isolator plate 106 to allow relative movement between the cage 104 and the isolator plate 106. When the piston 26 is in the initial position, the cage 104 is disconnected from the isolator plate 106 such that the engine 12 cannot be started. Therefore, when the piston 26 is in the initial position, relative movement between the cage 104 and the isolator plate 106 is allowed about the longitudinal axis 22. It is to be appreciated that the input member 100 will remain rotating about the longitudinal axis 22 after the engine 12 is started.

In addition, it is to be appreciated that the input member 100 can rotate about the longitudinal axis 22 in a clockwise direction or a counter-clockwise direction. Therefore, the direction the piston 26 and the biasing member 54 are clocked can change depending on whether the input member 100 is rotating in the clockwise direction or counter-clockwise direction. As such, depending on the direction that the input member 100 rotates, the engagement between the projections 86 of the biasing member 54 and the ridges 84 of the cutouts 82 can change. Furthermore, depending on the direction that the input member 100 rotates, the engagement between the tabs 60 and the shoulder 80 of respective flanges 30 can change. For example, when the input member 100 rotates in the clockwise direction, the projections 86 engage respective ridges 84 and the second end 64 of the tabs 60 engage the shoulder 80 of respective flanges 30 as illustrated in FIG. 3. As another example, even though not illustrated, when the input member 100 rotates in the counter-clockwise direction, the projections 86 engage the other respective ridges 84 and the first end 62 of the tabs 60 engage the shoulder 80 of respective flanges 30.

While the best modes for carrying out the disclosure have been described in detail, those familiar with the art to which this disclosure relates will recognize various alternative designs and embodiments for practicing the disclosure within the scope of the appended claims.

The invention claimed is:

1. A clutch assembly for a vehicle, the assembly comprising:
a housing defining a cavity presenting an interior surface, with the interior surface defining a pocket along a longitudinal axis; and
a piston disposed in the pocket and movable between an initial position and a final position relative to the pocket along the longitudinal axis, with the piston including a plurality of flanges extending outwardly away from the longitudinal axis;
a biasing member attached to the interior surface of the housing and engaging the piston to continuously bias the piston toward the initial position, with the biasing member abutting the flanges of the piston to prevent rotation of the piston about the longitudinal axis as the piston moves between the initial and final positions along the longitudinal axis.

2. An assembly as set forth in claim 1 wherein each of the flanges define a first depression and a second depression spaced from each other to present a shoulder between respective first and second depressions of respective flanges, with the first and second depressions receiving the biasing member such that the biasing member engages the shoulder of the flanges to prevent rotation of the piston about the longitudinal axis.

3. An assembly as set forth in claim 2 wherein the biasing member includes a plurality of tabs spaced from each other radially relative to the longitudinal axis, with one of the tabs engaging the shoulder of one of the flanges and another one of the tabs engaging the shoulder of another one of the flanges to prevent rotation of the piston about the longitudinal axis.

4. An assembly as set forth in claim 3 wherein each of the tabs include a first end and a second end spaced from each other, with the first end of one of the tabs disposed in the first depression of one of the flanges and the second end of the same one of the tabs disposed in the second depression of another one of the flanges.

5. An assembly as set forth in claim 4 wherein the biasing member includes a body having a first edge and a second edge spaced from each other transverse to the longitudinal axis, with each of the tabs including a neck extending from the first edge of the body toward the longitudinal axis, and each of the tabs include a strip extending from the neck of respective tabs such that the strip of each of the tabs engage the shoulder of respective flanges, with the strip of each of the tabs including the first and second ends spaced from each other radially relative to the longitudinal axis.

6. An assembly as set forth in claim 2 wherein the biasing member includes a plurality of tabs spaced from each other radially relative to the longitudinal axis, and the shoulder of each of the flanges are spaced from each other radially relative to the longitudinal axis, with the shoulder of each of the flanges and the tabs of the biasing member arranged in an alternating pattern about the longitudinal axis.

7. An assembly as set forth in claim 1 wherein the flanges are spaced from each other radially relative to the longitudinal axis to define a plurality of gaps, with the gaps and the flanges arranged in an alternating pattern about the longitudinal axis.

8. An assembly as set forth in claim 7 wherein the piston includes a first side and a second side spaced from each other along the longitudinal axis, with the flanges disposed between the first and second sides, and the second side disposed in the pocket of the housing, and further including a bearing device abutting the first side of the piston, and the biasing member engaging the bearing device such that the biasing member couples the bearing device to the piston, with the bearing device movable concurrently with the piston between the initial and final positions.

9. An assembly as set forth in claim 8 wherein the biasing member includes a plurality of tabs spaced from each other radially relative to the longitudinal axis, with one of the tabs overlapping one of the gaps and another one of the tabs overlapping another one of the gaps, and wherein the bearing device includes a sleeve and a plurality of fingers attached to the sleeve, with one of the fingers disposed in one of the gaps and another one of the fingers disposed in another one of the gaps such that the fingers engage respective tabs of the biasing member to couple the bearing device to the first side of the piston.

10. An assembly as set forth in claim 8 further including an input member coupled to the housing and partially disposed in the cavity, with the input member rotatable about the longitudinal axis and configured for receiving a torque, and further including a damper apparatus disposed in the cavity and coupled to the input member, with the damper apparatus including a cage coupled to the input member and an isolator plate disposed in the cage, with the isolator plate attached to the input member and extending radially away from the input member relative to the longitudinal axis, and the isolator plate concurrently rotates with the input member about the longitudinal axis, and further including a coupling device coupled to the input member and the damper apparatus, with the bearing device engaging the coupling device when the piston is in the final position to connect the cage to the isolator plate to provide synchronized movement of the isolator plate and the cage with the input member about the longitudinal axis.

11. An assembly as set forth in claim 10 wherein the coupling device includes a first friction plate coupled to the cage such that the first friction plate concurrently rotates with the cage, and the coupling device includes a second friction plate coupled to the input member such that the second friction plate concurrently rotates with the input member and the isolator plate, with the first friction plate extending radially toward the input member relative to the longitudinal axis and the second friction plate extends radially away from the input member relative to the longitudinal axis such that the first and second friction plates cooperate to selectively engage each other, with the bearing device engaging one of the first and second friction plates when the piston is in the final position to sandwich the first and second friction plates between the bearing device and the isolator plate to connect the cage to the isolator plate.

12. An assembly as set forth in claim 1 wherein the piston includes an outer surface facing away from the longitudinal axis and the flanges extend from the outer surface, with the outer surface defining a groove, and further including a first seal disposed in the groove and engaging the pocket of the housing for sealing the pocket between the interior surface of the housing and the outer surface of the piston.

13. An assembly as set forth in claim 12 wherein the piston includes an inner surface opposing the outer surface, and the interior surface of the housing defines a slot adjacent to the pocket, and further including a second seal disposed in the slot and engaging the inner surface of the piston for sealing the pocket between the interior surface of the housing and the inner surface of the piston.

14. A transmission for a vehicle including an engine, the transmission comprising:
a housing configured for attachment to the engine, with the housing defining a cavity presenting an interior surface, with the interior surface defining a pocket along a longitudinal axis;
an input member rotatably coupled to the housing and partially disposed in the cavity, with the input member rotatable about the longitudinal axis and configured for receiving a torque to start the engine;
a damper apparatus disposed in the cavity and including a cage coupled to the input member and an isolator plate disposed in the cage, with the isolator plate attached to the input member such that the isolator plate concurrently rotates with the input member about the longitudinal axis; and
a piston including a plurality of flanges, with the piston disposed in the pocket and movable between an initial position and a final position relative to the pocket along the longitudinal axis, with the cage disconnected from the isolator plate when the piston is in the initial position to allow relative movement between the isolator plate and the cage about the longitudinal axis, and with the cage connected to the isolator plate when the piston is in the final position to provide synchronized movement of the isolator plate and the cage about the longitudinal axis;
a biasing member attached to the interior surface of the housing and engaging the piston to continuously bias the piston toward the initial position, with the biasing member abutting the flanges of the piston to prevent rotation of the piston about the longitudinal axis as the piston moves between the initial and final positions along the longitudinal axis.

15. A transmission as set forth in claim 14 wherein each of the flanges define a first depression and a second depression spaced from each other to present a shoulder between respective first and second depressions of respective flanges, with the first and second depressions receiving the biasing member such that the biasing member engages the shoulder of the flanges to prevent rotation of the piston about the longitudinal axis.

16. A transmission as set forth in claim 15 wherein the biasing member includes a plurality of tabs spaced from each other radially relative to the longitudinal axis, with one of the tabs engaging the shoulder of one of the flanges and another one of the tabs engaging the shoulder of another one of the flanges to prevent rotation of the piston about the longitudinal axis.

17. A transmission as set forth in claim 14 wherein the piston includes a first side and a second side spaced from each other along the longitudinal axis, with the flanges disposed between the first and second sides, and the second side disposed in the pocket of the housing, and further including a bearing device abutting the first side of the piston and disposed outside of the pocket, with the biasing member engaging the bearing device such that the biasing member couples the bearing device to the piston, with the bearing device movable concurrently with the piston between the initial and final positions.

18. A transmission as set forth in claim 17 further including a coupling device coupled to the input member and the damper apparatus, with the bearing device engaging the coupling device when the piston is in the final position to connect the cage to the isolator plate to provide synchronized movement of the isolator plate and the cage with the input member about the longitudinal axis for starting the engine.

19. A transmission as set forth in claim 18 wherein the coupling device includes a first friction plate coupled to the cage such that the first friction plate concurrently rotates with the cage, and the coupling device includes a second friction plate coupled to the input member such that the second friction plate concurrently rotates with the input member and the isolator plate, with the first friction plate extending radially toward the input member relative to the longitudinal axis and the second friction plate extends radially away from the input member relative to the longitudinal axis such that the first and second friction plates cooperate to selectively engage each other, with the bearing device engaging one of the first and second friction plates when the piston is in the final position to sandwich the first and second friction plates between the bearing device and the isolator plate to connect the cage to the isolator plate.

20. A transmission for a vehicle, the assembly comprising:
   a housing defining a cavity presenting an interior surface, with the interior surface defining a pocket along a longitudinal axis;
   a piston disposed in the pocket and movable between an initial position and a final position relative to the pocket along the longitudinal axis, with the piston including a first side and a second side spaced from each other along the longitudinal axis, and the second side disposed in the pocket of the housing; and
   wherein the piston includes a plurality of flanges disposed between the first and second sides, with the flanges extending outwardly away from the longitudinal axis, and each of the flanges define a first depression and a second depression spaced from each other to present a shoulder between respective first and second depressions of respective flanges;
   a biasing member attached to the interior surface of the housing and engaging the piston to continuously bias the piston toward the initial position;
   a bearing device abutting the first side of the piston and disposed outside of the pocket, with the biasing member coupling the bearing device to the first side of the piston such that the bearing device concurrently moves with the piston between the initial and final positions;
   wherein the biasing member includes a plurality of tabs spaced from each other radially relative to the longitudinal axis, with one of the tabs engaging the shoulder of one of the flanges and another one of the tabs engaging the shoulder of another one of the flanges to prevent rotation of the piston about the longitudinal axis as the piston moves between the initial and final positions along the longitudinal axis.

\* \* \* \* \*